Figure 1:
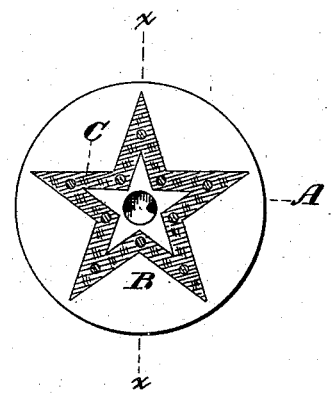

(Model.)

H. G. GUILD.
Manufacture of Articles from Glutinous or Plastic Materials.

No. 239,770.　　　　　　　　　Patented April 5, 1881.

ATTEST:
E. B. Bolton
Geo. Bainton

INVENTOR:
Henry G. Guild,
by his Attys
Burke, Fraser & Connett

UNITED STATES PATENT OFFICE.

HENRY G. GUILD, OF BROOKLYN, NEW YORK.

MANUFACTURE OF ARTICLES FROM GLUTINOUS OR PLASTIC MATERIALS.

SPECIFICATION forming part of Letters Patent No. 239,770, dated April 5, 1881.

Application filed October 18, 1880. (Model.)

*To all whom it may concern:*

Be it known that I, HENRY G. GUILD, a citizen of the United States, residing in Brooklyn, Kings county, New York, have invented certain new and useful Improvements in the Manufacture of Articles from Glutinous or Plastic Materials, of which the following is a specification.

This invention relates, in the main, to a method of ornamenting buttons or similar articles made wholly or in part from glutinous or plastic materials which melt or soften with heat or consolidate with pressure; and although especially adapted to the manufacture of buttons, it may also be employed in the production of counters, checks, jewelry, fancy boxes, and many other articles of an analogous character.

My object is to place the ornament or design, which is generally of tinsel, but which may be of any material, under a tough but transparent covering which will protect it, but will not obscure it in any material degree. To that end I employ for the facing of the article some transparent, or nearly transparent, substance which will, by preference, soften by heat, but which will be, when under the influence of ordinary temperature, hard and tough. I prefer to employ for this facing pulverized horn or hoof, choosing such as will be transparent when agglutinized by heat and pressure, and be free from dirt or color. I also prefer to make the body of the article of the same material, but generally colored or tinted. For the ornament or design I prefer tinsel or gilt paper, but may use any material so long as it will serve my purpose and not be injured by the process.

In the present case I will describe my invention as applied to the manufacture of buttons from ground horn or hoof, a material which has been and is now in common use in the manufacture of buttons.

I first place in the bottom of the mold or die a small quantity of clean pulverized horn or hoof, and upon this place the ornament—which may be a star, for example—cut from tinsel or other material. Upon this I then place the pulverized horn or hoof destined to form the body or mass of the button, which may be colored or not, as desired. I then subject this mass to heat and pressure in the usual way employed in making articles from this material, and when cool remove and polish the face of the button. It will now be found that the ornament or design is fixed to the body of the button under a tough, hard, transparent facing, which will effectually protect it against tarnish or abrasion and preserve it in all its original brightness and beauty. In fact, the facing and the body become one homogeneous mass.

Figure 2:
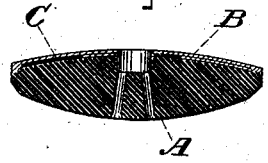

In the drawings I have shown a button (on a large scale) made according to my invention, in which Figure 1 is a view of the face of the button, and Fig. 2 is a cross-section of the same taken on the line $x\ x$ in Fig. 1.

A represents the body or mass of the button; B the transparent face, which is so intimately attached to the body as to form one with it; and C the ornament or design, which is interposed between the mass A and face B, or embedded in them. That part of the ornament which is in section in Fig. 2 is rendered by a heavy black line.

In some cases a finished button or other article made from glutinous or plastic material might have an ornament or design, and a superimposed transparent face affixed to it by this process; but I prefer to form the article simultaneously with the attachment of the article, as described. I might also form the face and body or mass of the article of different materials—as, for example, the mass might be of factitious ivory, and the face of horn.

I am aware that the following-described process has been employed in the manufacture of buttons—that is to say, an ornamental facing is made by mixing powdered shellac with gold-sand, "brocade," so called, and other granulated or flaky substances, melting and kneading the mass, and when cold pulverizing the same. This powder is sprinkled in the bottom of the mold and the material to form the button placed on top of it, and the whole pressed together under the influence of heat. This produces an ornamental face on the button, and some of the grains of ornamental material will lie on the surface and some will be embedded slightly. The opacity of the shellac will, however, practically hide the flakes or grains which are below the surface.

My process differs from the above in that the latter cannot employ a cut or stamped design—as a star—because the ornamental material must be in flakes or grains, mixed in a disorganized manner; and a portion, at least—and the visible portion—of the ornamental material will lie on the surface, or practically so. The shellac cracks also when applied to the face of a button in this manner, and will not stand wear and exposure as will pulverized horn or hoof.

My process contemplates the embedding of an organized design or ornament, as shown, of any material desired within the article to be ornamented, and behind a substantially transparent face, which forms a homogeneous part of the article itself. I may employ brocade or gold-sand in addition to the ornament or design; but to this I make no claim.

Having thus described my invention, I claim—

1. The method of ornamenting articles made from a plastic or glutinous material, which consists in placing the transparent facing material in the mold or die, then placing the ornament on this, and then placing the mass to form the body of the article on the ornament, after which the whole is subjected to heat or pressure, or both, to combine and consolidate the whole, as set forth.

2. A button or other article having a body of some plastic or glutinous material, a face of a similar transparent material, and an ornament under the transparent facing, the facing and the body of the article being consolidated into one homogeneous mass by means of heat or pressure, or both, as set forth.

In witness whereof I have hereunto signed my name in the presence of two subscribing witnesses.

HENRY G. GUILD.

Witnesses:
HENRY CONNETT,
GEO. BARNTON.